United States Patent
Seregin et al.

(10) Patent No.: US 11,153,583 B2
(45) Date of Patent: Oct. 19, 2021

(54) SPATIAL SCALABILITY SUPPORT IN VIDEO ENCODING AND DECODING

(71) Applicant: QUALCOMM Incorporated, San Diego, CA (US)

(72) Inventors: Vadim Seregin, San Diego, CA (US); Muhammed Zeyd Coban, Carlsbad, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/892,709

(22) Filed: Jun. 4, 2020

(65) Prior Publication Data
US 2020/0389659 A1   Dec. 10, 2020

Related U.S. Application Data

(60) Provisional application No. 62/858,901, filed on Jun. 7, 2019.

(51) Int. Cl.
*H04N 19/39* (2014.01)
*H04N 19/107* (2014.01)
(Continued)

(52) U.S. Cl.
CPC ........... *H04N 19/39* (2014.11); *H04N 19/107* (2014.11); *H04N 19/187* (2014.11); *H04N 19/61* (2014.11); *H04N 19/70* (2014.11)

(58) Field of Classification Search
CPC ...... H04N 19/39; H04N 19/107; H04N 19/70; H04N 19/61; H04N 19/187; H04N 19/44; H04N 19/30
See application file for complete search history.

(56) References Cited

U.S. PATENT DOCUMENTS

| 9,648,322 B2 | 5/2017 | Wang |
| 10,681,382 B1 | 6/2020 | Brailovskiy |

(Continued)

OTHER PUBLICATIONS

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

(Continued)

*Primary Examiner* — Tracy Y. Li
(74) *Attorney, Agent, or Firm* — Shumaker & Sieffert, P.A.

(57) ABSTRACT

A video encoder or video decoder can be configured to obtain multi-layer video data that includes at least a first layer and a second layer; determine a layer identification value for the first layer and a layer identification value for the second layer, wherein the layer identification value for the second layer is higher than the layer identification value for the first layer; store decoded pictures of the first layer and decoded pictures of the second layer in a decoded picture buffer; and in response to determining that a picture of a layer is an instantaneous decoding refresh (IDR) picture, remove from the decoded picture buffer, all decoded pictures of a layer the IDR picture belongs to, while leaving in the decoded picture buffer all decoded pictures with layer identifications lower than a layer identification of the layer the IDR picture belongs to.

24 Claims, 10 Drawing Sheets

(51) Int. Cl.
*H04N 19/70* (2014.01)
*H04N 19/61* (2014.01)
*H04N 19/187* (2014.01)

(56) References Cited

U.S. PATENT DOCUMENTS

| | | | |
|---|---|---|---|
| 2013/0064284 A1 | 3/2013 | Samuelsson et al. | |
| 2014/0192895 A1 | 7/2014 | Chen et al. | |
| 2015/0264404 A1* | 9/2015 | Hannuksela | H04N 19/70 375/240.16 |
| 2015/0271526 A1* | 9/2015 | Hendry | H04N 19/187 375/240.26 |
| 2016/0249056 A1* | 8/2016 | Tsukuba | H04N 19/30 |

OTHER PUBLICATIONS

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29NVG11 and ITU-T SG.16 ); URL: HTTP://PHENIX.INT-EVRY.FR/JVET/,, No. JVET-A1001 Feb. 24, 2016 (Feb. 24, 2016), XP030150000, 27 pages.

Choi, B. et al., "AHG8: On Spatial Scalability Support with Reference Picture Resampling," JVET-O0333, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-6.

Hannuksela, M. et al., "AHG8: On Adaptive Resolution Changing and Scalable Coding," JVET-O0395-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Seregin, V. et al., "AHG8: On Inter-Layer Reference for Scalability Support," JVET-O0243-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Wang, Y. et al., "AHG8: Scalability for VVC—Handling of POC, RPL, and RPM," JVET-O0136-v1, Joint Video Experts Team (JVET) of ITU-T SG 16 WP 3 and ISO/IEC JTC 1/SC 29/WG 11, 15th Meeting, Gothemburg, SE, Jul. 3-12, 2019, pp. 1-14.

Wang, Y. et al., "AHG8: Scalability for VVC—Text for Approach 3," JVET-O1160-v1, Joint Video Experts Team (JVET) of ITU-T SG 16 WP 3 and ISO/IEC JTC 1/SC 29/WG 11, 15th Meeting, Gothernburg, SE, Jul. 3-12, 2019, pp. 1-2.

International Search Report and Written Opinion—PCT/US2020/036268—ISA/EPO—dated Nov. 20, 2020 20 Pages.

Partial International Search Report—PCT/US2020/036268—ISA/EPO—dated Sep. 30, 2020 16 Pages.

Ramasubramonian A.K., et al., "MV-HEVC/SHVC HLS: On Flushing of Decoded Pictures from the DPB Based on NoOutputOfPriorPicsFlag" JCT-VC 15th Meeting, Oct. 23, 2013-Jan. 11, 2013, Geneva, (Joint Collaborative Team on Video Coding of ISO/IEC JTC1/SC29/WG11 and ITU-T SG.16 WP3); URL: HTTP://WFTP3.ITU.INT/AV-ARCH/JCTVC-SITE/, No. JCTVC-O0266, Oct. 15, 2013.

Seregin V., et al., "SHVC HLS: Earlier DPB Clearing for Adaptive Resolution Change," 14. JCT-VC Meeting, Jul. 25, 2013-Aug. 2, 2013, Vienna, (Joint Collaborative Team on Video Coding of ISO/IEC JTC1/SC29/WG11 and ITU-T SG.16 ), URL: HTTP://WFTP3.ITU.INT/AV-ARCH/JCTVC-SITE/, No. JCTVC-N0110, XP030114560, Jul. 16, 2013.

Skupin (Fraunhofer) R., et al., "Ultra-Low Delay With SHVC, MV-HEVC and 3D-HEVC," 5. JCT-3V Meeting, Jul. 27, 2013-Aug. 2, 2013, Vienna, (The Joint Collaborative Team on 3D video Coding Extension Development of ISO/IEC JTC1/SC29/WG11 and ITU-T SG.16 ), No. JCT3V-E0098, Jul. 16, 2013.

\* cited by examiner

SPATIAL SCALABILITY SUPPORT IN VIDEO ENCODING AND DECODING

This application claims the benefit of U.S. Provisional Application 62/858,901, filed 7 Jun. 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to multi-layer video data encoding and decoding and, more specifically, to techniques for managing a decoded picture buffer for multi-layer video data encoding and decoding. This disclosure also describes techniques for detecting the start of a new access unit in multi-layer video data encoding and decoding. Multi-layer video data may be used to enable spatial scalability.

According to one example of this disclosure, a method of decoding multi-layer video data includes obtaining the multi-layer video data, wherein the multi-layer video data comprises at least a first layer and a second layer; determining a layer identification value for the first layer and a layer identification value for the second layer, wherein the layer identification value for the second layer is higher than the layer identification value for the first layer; storing decoded pictures of the first layer and decoded pictures of the second layer in a decoded picture buffer; and in response to determining that an instantaneous decoding refresh (IDR) picture belongs to the second layer, removing from the decoded picture buffer, all decoded pictures of the second layer while leaving in the decoded picture buffer all decoded pictures of the first layer.

According to another example of this disclosure, a device for decoding multi-layer video data includes a memory configured to store the multi-layer video data and one or more processors implemented in circuitry and configured to obtain the multi-layer video data, wherein the multi-layer video data comprises at least a first layer and a second layer; determine a layer identification value for the first layer and a layer identification value for the second layer, wherein the layer identification value for the second layer is higher than the layer identification value for the first layer; store decoded pictures of the first layer and decoded pictures of the second layer in a decoded picture buffer; and in response to determining that an instantaneous decoding refresh (IDR) picture belongs to the second layer, remove from the decoded picture buffer, all decoded pictures of the second layer while leaving in the decoded picture buffer all decoded pictures of the first layer.

According to another example of this disclosure, a computer-readable storage medium stores instructions that when executed by one or more processors cause the one or more processor to obtain the multi-layer video data, wherein the multi-layer video data comprises at least a first layer and a second layer; determine a layer identification value for the first layer and a layer identification value for the second layer, wherein the layer identification value for the second layer is higher than the layer identification value for the first layer; store decoded pictures of the first layer and decoded pictures of the second layer in a decoded picture buffer; and in response to determining that an instantaneous decoding refresh (IDR) picture belongs to the second layer, remove from the decoded picture buffer, all decoded pictures of the second layer while leaving in the decoded picture buffer all decoded pictures of the first layer.

An apparatus for decoding multi-layer video data includes means for obtaining the multi-layer video data, wherein the multi-layer video data comprises at least a first layer and a second layer; means for determining a layer identification value for the first layer and a layer identification value for the second layer, wherein the layer identification value for the second layer is higher than the layer identification value for the first layer; means for storing decoded pictures of the first layer and decoded pictures of the second layer in a decoded picture buffer; and means for removing from the decoded picture buffer, all decoded pictures of the second layer while leaving in the decoded picture buffer all decoded pictures of the first layer in response to determining that an instantaneous decoding refresh (IDR) picture belongs to the second layer.

The details of one or more examples are set forth in the accompanying drawings and the description below. Other features, objects, and advantages will be apparent from the description, drawings, and claims.

DETAILED DESCRIPTION

Figure 1:
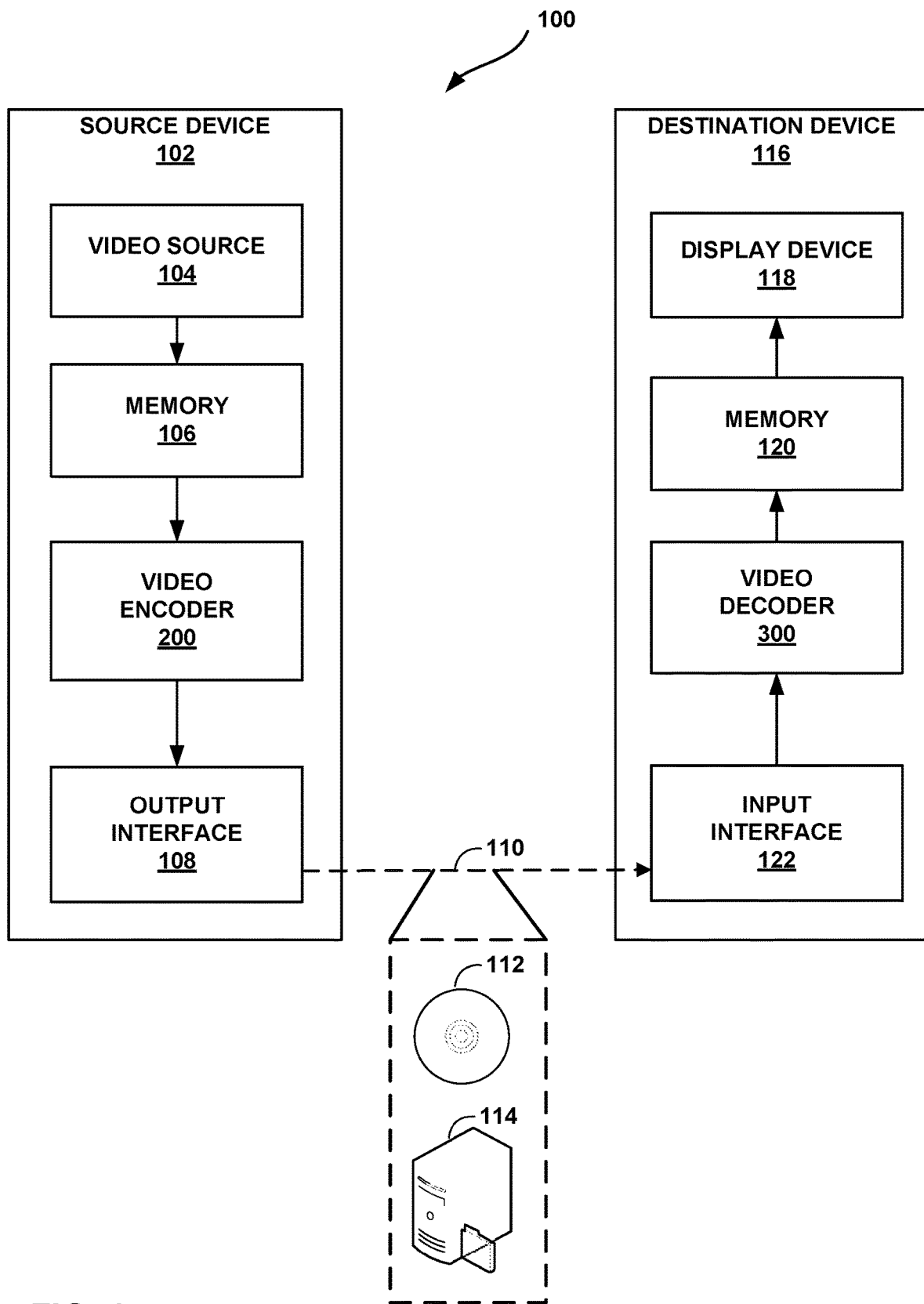
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

In order to allow for scalability, which generally refers to the ability of a video bitstream to support multiple spatial resolutions and/or multiple frame rates, some video bitstreams include multiple layers. A multi-layer bitstream may include a base layer and one or more non-base layers. Non-based layers are also sometimes referred to as enhancement layers. In a scalable bitstream, the base layer may typically have a layer identifier (e.g., nuh_layer_id) that is equal to zero and may be independently decodable, meaning the base layer can be decoded without needing information from other layers. A non-base layer may have a layer identifier that is greater than zero and may provide additional video data that is not included in the base layer. This additional video data may, for example, include more sample values that can be used to increase spatial resolution or frame rate. A non-base layer may or may not be independently decodable. Some non-based layers cannot be decoded without accessing information associated with other layers, and thus are considered to depend on those other layers. A video coding layer (VCL) network abstraction layer (NAL) unit generally refers a coded slice NAL unit that includes the video data for a slice of a picture. A layer generally refers to a set of VCL NAL units that all have a particular value of nuh_layer_id and the associated non-VCL NAL units.

A NAL unit is a syntax structure containing an indication of the type of data to follow and bytes containing that data in the form of a raw byte sequence payload (RBSP) interspersed as necessary with emulation prevention bytes. An access unit (AU) is a set of picture units that belong to different layers and contain coded pictures associated with the same time. A picture unit is a set of NAL units that are associated with each other according to a specified classification rule, are consecutive in decoding order, and contain exactly one coded picture.

An instantaneous decoding refresh (IDR) picture is a type of picture that does not use inter prediction in the decoding process, and thus may be the first picture in the bitstream in decoding order. An IDR picture may also appear later in the bitstream and be used for random access, which generally refers to the act of starting the decoding process for a bitstream at a point other than the beginning of the stream. Each IDR picture is the first picture of a coded video sequence (CVS) in decoding order.

Video encoders and video decoders store decoded pictures in a decoded picture buffer (DPB), so that the decoded pictures can be used as reference pictures to encode and decode later pictures in the bitstream. A reference picture contains samples that may be used for inter prediction in the decoding process of subsequent pictures in decoding order. Determining which pictures to keep in a DPB and which pictures to remove, i.e., "bump," can present unique challenges for multilayer video data because adding a picture from one layer to the DPB may bump pictures from other layers. This disclosure describes techniques for bumping pictures from a DPB when a layer of video data includes an DR picture.

According to some techniques of this disclosure, in response to determining that a picture of a layer is an IDR picture, a video decoder may remove from a DPB, all decoded pictures of the layer the IDR picture belongs to, while leaving in the decoded picture buffer all decoded pictures with the lower layer IDs. By configuring a video decoder in this manner, the video decoder may preserve the ability to decode future pictures based on the decoded picture with the lower layer IDs, when those lower layers do not include IDR picture. By managing a DPB in this manner, a video decoder may prevent coding scenarios that result in non-decodable bitstreams due to necessary reference pictures being unavailable.

According to some techniques of this disclosure, in response to determining (1) that a VCL NAL unit of a second access unit has a layer identification smaller than a layer identification of an immediately preceding picture in decoding order and (2) that the VCL NAL unit of the second access unit has a picture order count (POC) value different than a POC value for the immediately preceding picture in the decoding order, the video decoder may determine that the VCL NAL unit of the second access unit corresponds to a start of the second access unit. This technique may represent an improved way for detecting the start of a new access unit by not placing an undue burden on single layer video decoders.

Although techniques of this disclosure may be described from the perspective of a video decoder, it should be understood that the described techniques may also be performed by a video encoder. For example, a video encoder typically also decodes video data as part of the process of determining how to encode the video data. In conjunction with that decoding, the video encoder may maintain a DPB using the same techniques as a video decoder.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply techniques for continuous picture order count (POC) numbering described in this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for continuous POC numbering, to support scalability, described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data, including encoded multi-layer video data, via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may output, for example by modulating, a transmission signal including the encoded video data, and input interface 122 may receive, for example by demodulating, the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data, including encoded multi-layer video data, from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), an optical fiber connection, or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14th Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to remove from a DPB all decoded pictures of a layer that an DR picture belongs to in response to determining that the picture of the layer is an IDR picture. In response to determining that the picture of the layer is an IDR picture, video encoder 200 and video decoder 300 may also be configured to leave in the decoded picture buffer all decoded pictures with layer IDs lower than the layer of the DR picture. By configuring, video encoder 200 and video decoder 300 in this manner, video encoder 200 and video decoder 300 may preserve the ability to decode future pictures based on the decoded picture with the lower layer IDs, when those lower layers do not include an IDR picture. By managing a DPB in this manner, video encoder 200 and video decoder 300 may prevent coding scenarios that result in non-decodable bitstreams due to necessary reference pictures being unavailable.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
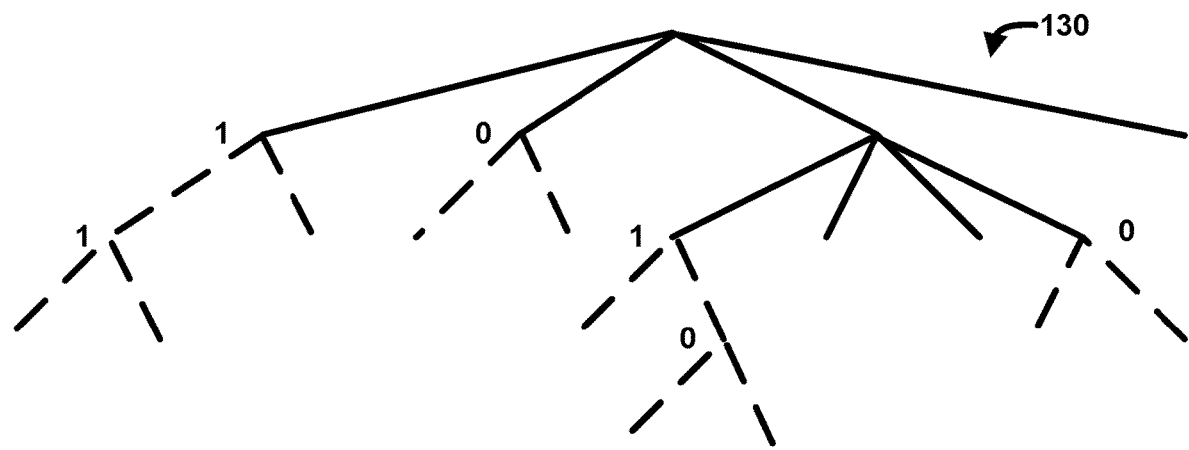
FIGS. 2A and 2B are conceptual diagrams illustrating an example quadtree binary tree (QTBT) structure, and a corresponding coding tree unit (CTU).
Figure 2B:
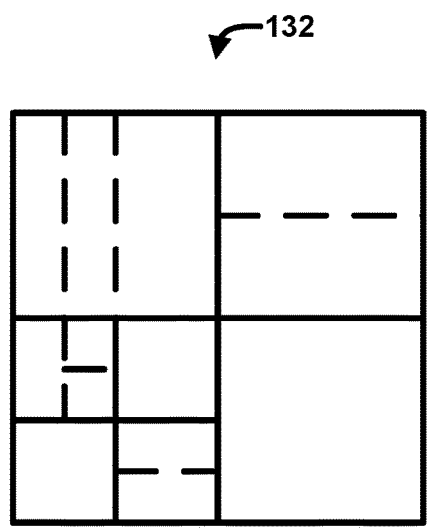

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

In VVC, there is a reference picture resampling (RPR) tool under consideration. This tool allows a video coder to use reference picture(s) with a picture size different than the current picture size. In such a case, a picture resampling process may be invoked to provide an upsampled or downsampled version of the picture to match the current picture size, similar, for example, to spatial scalability as implemented in HEVC. This disclosure describes several techniques, which may be used separately or in conjunction with one another, to add support for spatial scalability in VVC in conjunction with the RPR tool.

This disclosure describes techniques related to VPS signaling, which may, for example, be used by middle boxes to deliver streaming video data. In this context, a middle box generically refers to a video router, bitstream splicing and extracting devices, and other such devices.

Multi-layer video data can include different types of layer dependencies, which may be derived from a reference picture list, i.e., a list of reference pictures that may be used for inter predicting P and B slices. Typically video encoder 200 and video decoder 300 may maintain two reference picture lists, reference picture list 0 and reference picture list 1, which are generated for each slice of a non-IDR picture. A reference picture list, however, is not a convenient mechanism for a middle box to use when performing sub-bitstream extraction, i.e., when a certain layer or layers are extracted into a separate bitstream, because the dependencies between the layers cannot be determined by the middle box without performing substantial decoding operations. Thus, a middle box cannot confirm that dependencies are consistent across different pictures. For example, a middle box cannot simply discard unneeded NAL units by checking layer IDs.

This disclosure describes techniques for indicating the dependencies between layers in a high level parameter set (PS), such as a VPS. A middle box can use these indications to determine which layers may be independently decoded and which layers depend on other layers. Video encoder 200 and video decoder 300 can be configured to maintain reference pictures lists in accordance with these indications and not use other layers for prediction. With such techniques, a middle box can simply discard unneeded NAL units by checking the layer IDs for those NAL units.

A reference picture structure is a structure used for picture marking to identify which pictures are to be kept in a DPB, and which pictures can be removed or bumped from the DPB in order to release the memory. A reference picture structure may allow for other layers that are different from dependent layers as indicated in a PS. It may be needed for pictures from other layers to stay in a DPB and not be bumped.

For example, assume there are three layers, with layer0 being independently coded and layer1 and layer2 both depending on layer0 (i.e., layer0 pictures can be used for prediction of layer1 and layer2 pictures). In this example, a middle box or video decoder may extract layer0 from the bitstream, extract layer0 and layer1 from the bitstream, or extract layer0 and layer2 from the bitstream. Accordingly, a PS may indicate that layer0 has no layer dependency, layer1 depends on layer0, and layer2 depends on layer0. In each picture of a layer, all reference pictures from all layers which are needed for prediction can be included in a reference picture structure. For example layer2 may have layer0 and layer1 reference pictures. Layer1 pictures may not be needed for layer2 prediction, but may be included in the marking process for determining if those pictures are to be kept or bumped from the DPB. However, a reference picture list for a picture from layer2 may not have layer1 pictures because layer2 does not depend on layer1 in this example.

This disclosure describes a "bumping process" for removing reference pictures from a decoded picture buffer. In this context, bumping or removing merely means that a reference picture is no longer available for reference and that the memory location used for storing that reference picture is available to store other data. The terms bumping or removing do not require or imply any sort of active steps to delete or remove the reference picture from memory.

As mentioned in the previous section, when a picture from a layer is decoded, the decoded picture may bump pictures of other layers from the DPB. According to a technique of this disclosure, however, video encoder 200 and video decoder 300 may be configured to implement a constraint that only the pictures of the same layer as the current picture or higher layers are bumped. When higher layers use lower layer pictures for prediction, pictures can be bumped. For example, video encoder 200 and video decoder 300 may be configured such that a layer1 picture cannot bump a picture of layer0 from the DPB, but the layer1 picture can bump a layer2 picture, assuming that layer0 is a lower layer than layer1 and that layer1 is a lower layer than layer2. In this example, dependency across layers is considered because a higher layer may be independently coded from the lower layer. In such an example, a lower layer picture does not bump or mark higher layer pictures.

According to techniques of this disclosure, when a layer has an DR picture, all the pictures of that layer and higher layers are removed from the DPB, but lower layer pictures may be kept because the lower layer may not be an IDR and pictures in that layer may be needed for continuing decoding. Without this constraint, a video decoder may remove all pictures from the DPB, such that lower layers cannot be decoded. To implement this constraint, video encoder 200 and video decoder 300 may be configured to determine a layer identification value for a first layer and a layer identification value for a second layer, with the layer identification value for the second layer being higher than the layer identification value for the first layer, and store decoded pictures of the first layer and decoded pictures of the second layer in a DPB. In response to determining that an IDR picture belongs to the second layer, video encoder 200 and video decoder 300 may be configured to remove, from the DPB, all decoded pictures of the second layer while leaving in the DPB all decoded pictures of the first layer.

Figure 3:
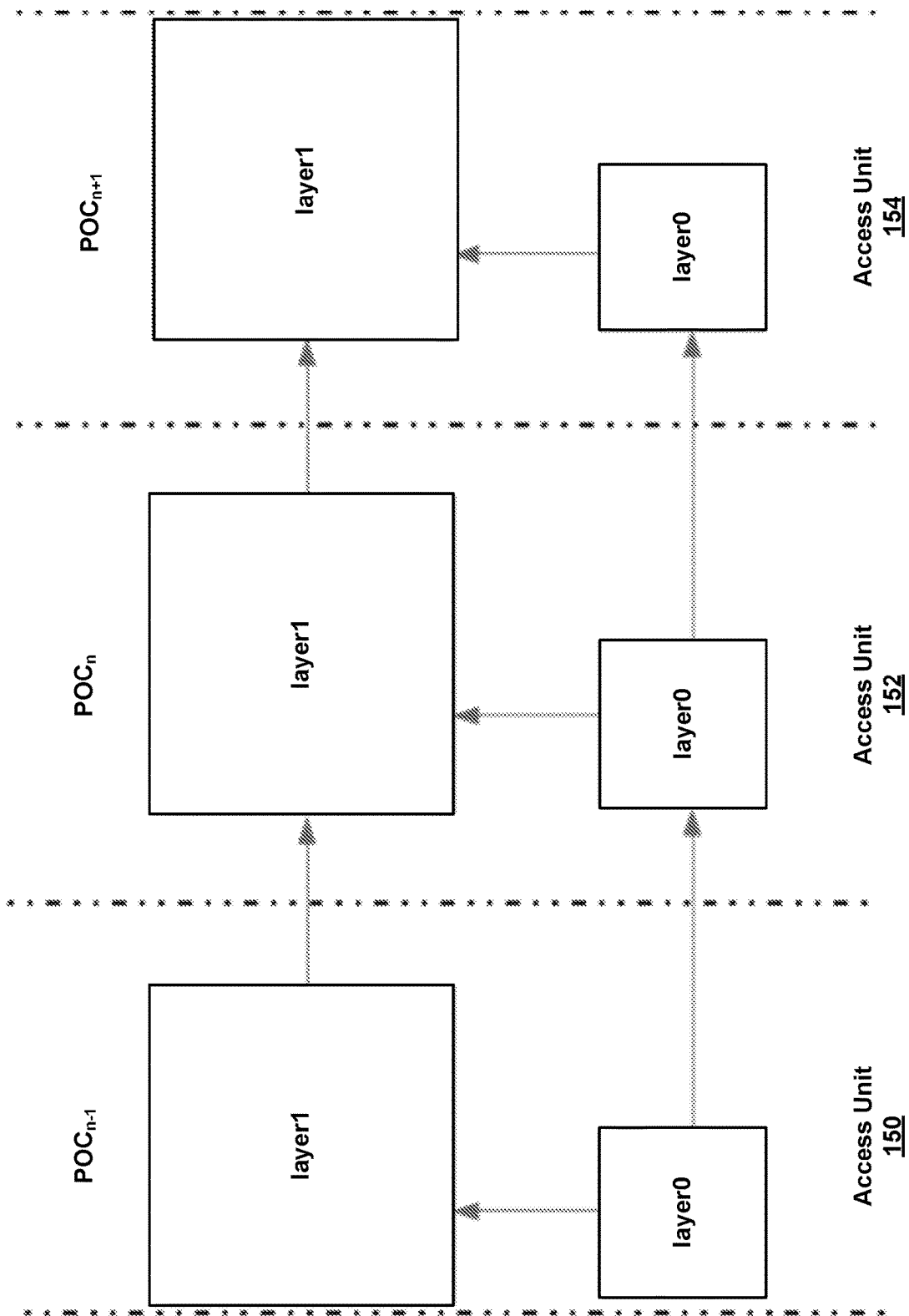
FIG. 3 shows an example where pictures within an access unit have the same POC value.

This disclosure also describes modifications to constraints implemented for access units. In a multilayer stream, there can be two cases, as depictured in FIGS. 3 and 4. In FIG. 3, the pictures of the different representation may have the same POC value as for example in the scalable high efficiency coding (SHVC) (H.265/HEVC) standard. In the example of FIG. 3, both the layer0 and layer1 pictures of access unit 150 have a POC value of $POC_{n-1}$, both the layer0 and layer1 pictures of access unit 152 have a POC value of $POC_n$, and both the layer0 and layer1 pictures of access unit 154 have a POC value of $POC_{n+1}$. That is, all pictures of a same access unit have the same POC value. Such a convention does not alter the definition of an AU, but may put an undue processing burden on single-layer decoders, which are common and widespread.

Figure 4:
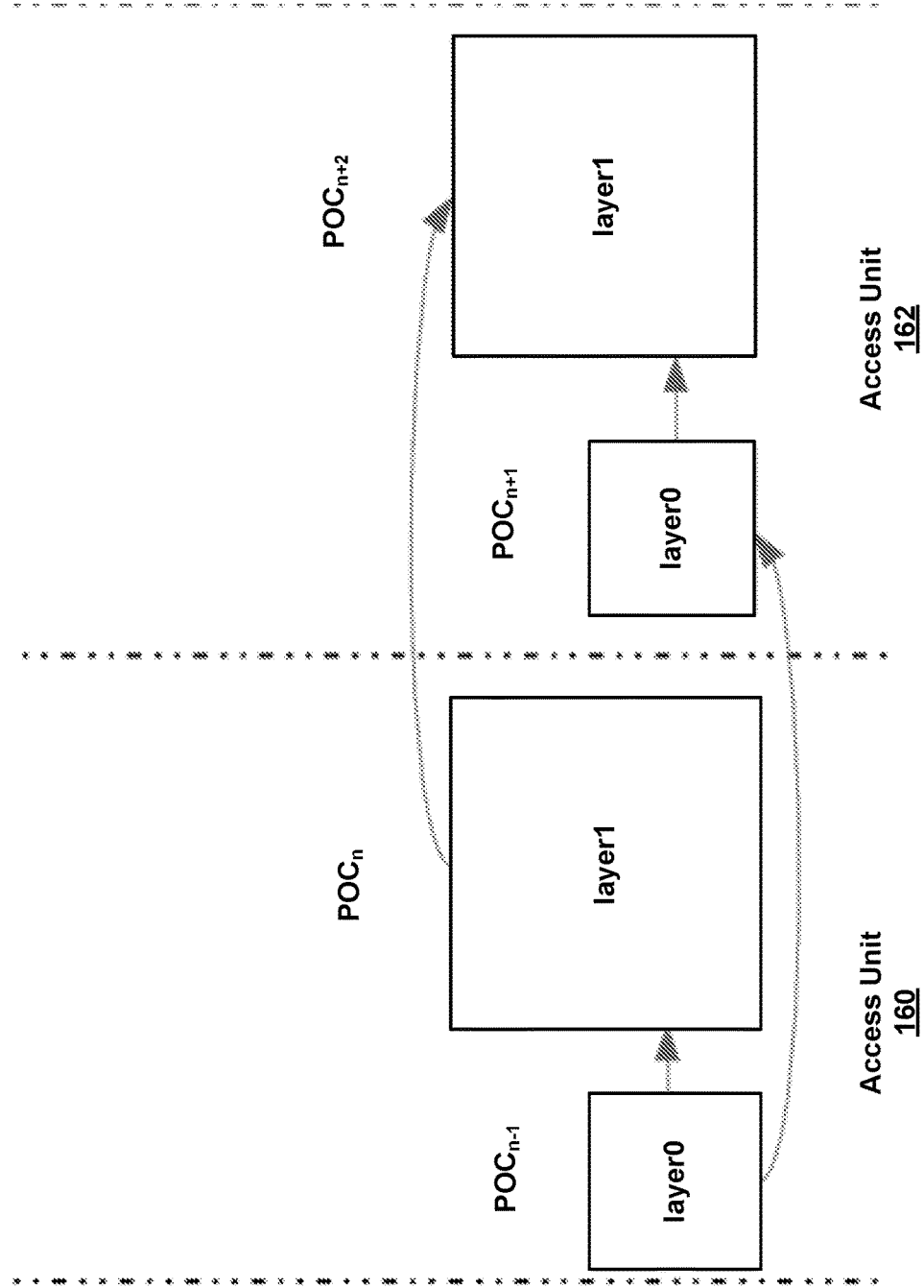
FIG. 4 shows an example where POC counting is continuous across different layers and pictures within an access unit have different POC values.

Alternatively, POC counting may be continuous across different layers as shown in FIG. 4. In FIG. 4, for example, access unit 160 includes a layer 0 picture with POC value $POC_{n-1}$ and a layer 1 picture with a POC value of $POC_n$. Access unit 162 includes a layer 0 picture with POC value $POC_{n+1}$ and a layer 1 picture with a POC value of $POC_{n+2}$. In this case, there is no need for a video decoder to handle the same POC number pictures, because all POCs are unique, but the definition of an AU needs to be changed to reflect the layered stream.

In one example technique of this disclosure, the definition of the AU includes the layer ID check. For example, the new AU starts when a picture is encountered with a layer ID that is lower than or the same as a layer ID of the previous picture. This definition is contrary to the definition of an AU as currently defined in VVC draft 5, where only the POC values are checked.

To implement this example, video encoder 200 and video decoder 300 may be configured to implement a constraint that requires the layer ID numbering to be in an increasing order.

Using terminology of VVC draft 5, the AU definition may be changed to the following:
  Let firstVclNalUnitInAu be a VCL NAL unit that is the first VCL NAL unit of a coded picture and for which the derived PicOrderCntVal differs from the PicOrderCntVal of the previous coded picture and nuh_layer_id is smaller or equal to the nuh_layer_id of the previous coded picture. The first of any of the following NAL units preceding firstVclNalUnitInAu and succeeding the last VCL NAL unit preceding firstVclNalUnitInAu, if any, specifies the start of a new access unit:
  access unit delimiter NAL unit (when present),
  DPS NAL unit (when present),
  VPS NAL unit (when present),
  SPS NAL unit (when present),
  PPS NAL unit (when present),
  APS NAL unit (when present),
  Prefix SEI NAL unit (when present),
  NAL units with NalUnitType equal to RSV_NVCL_5, RSV_NVCL_6, RSV_NVCL_21, or RSV_NVCL_22 (when present),
  NAL units with NalUnitType in the range of UNSPEC28 . . . UNSPEC29 (when present).
When there are none of the above NAL units preceding firstVclNalUnitInAu and succeeding the last VCL NAL preceding firstVclNalUnitInAu, if any, firstVclNalUnitInAu starts a new access unit if <<nuh_layer_id is smaller or equal to the nuh_layer_id of the previous coded picture>>

The text within the symbols <<and >> above are the examples of the layer ID check for AU determination. AU determination is needed particularly to know which picture may be output or displayed, since loosely pictures of the same AU may be considered having the same content but in the different representation (resolution).

To process AUs of the type described above, video encoder 200 and video decoder 300 may be configured to determine that a VCL NAL unit of a second access unit corresponds to a start of the second access unit in response to determining (1) that a VCL NAL unit of the second access unit has a layer identification smaller than a layer identification of an immediately preceding picture in decoding order and (2) that the VCL NAL unit of the second access unit has a POC value different than a POC value for the immediately preceding picture in decoding order. A NAL unit received between the VCL NAL unit of the second access unit and a last VCL NAL unit of the immediately preceding picture is an access unit delimeter NAL unit.

Figure 5:
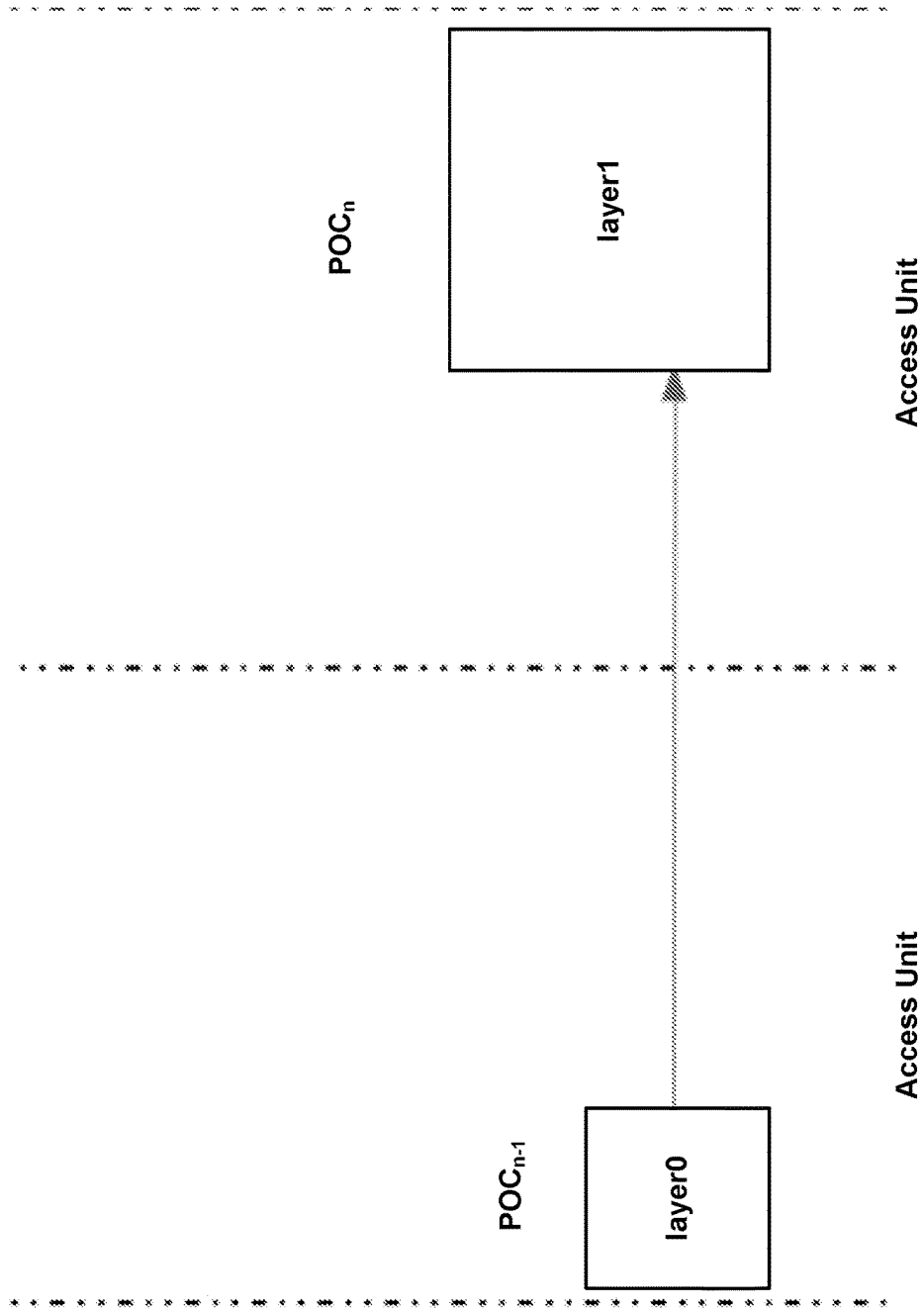
FIG. 5 shows an example of access units where not all layers are present in the access unit.

Video decoder 300 may be configured to process non-complete AUs. There may coding scenarios where not all layers are present in the access unit, as shown in the example of FIG. 5. In this scenario, applying the above definition of the AU may not provide the AU split between the pictures because the layer1 picture has a higher layer ID than the layer0 picture. A video decoder may treat such a coding scenario as one AU under the definition above, which may not be desirable because those pictures may not represent the same content.

To fix this potential problem, this disclosure sets forth the following potential solutions. Video encoder 200 may be configured to insert an AU delimiter between the layer0 and layer1 picture to indicate the indented AU delimiter. An AU delimiter indicates which NAL units belong to a previous AU and which NAL units belong to a next AU. Thus, video decoder 300 may process AU delimiters to identify NAL units belonging to the same AU.

Video encoder 200 may be configured to continue numbering POCs in the same manner as other layer pictures in the AU, i.e. each AU can have POCs for a number of layers and the AU definition can include a POC different check. That is, the start of a new AU can be signaled by the POC difference between two pictures equaling or exceeding a threshold, which may be equal to the number of layers. In other words, video encoder 200 may be configured to assign POC values as num_layers*POC+layer_id.

Video encoder 200 may be configured to assign different temporal IDs to the pictures in layer0 and layer1. A check for temporal IDs may be added to the AU definition. For example, a new AU starts at a NAL unit with a temporal ID that is different from the temporal ID of the previous NAL unit. In the above example, to have an AU delimiter, video encoder 200 may assign the picture in layer0 temporal ID 0 and the assign the layer1 picture temporal ID 1. Video decoder 300 can then detect the start of a new AU at the layer1 picture.

This disclosure also describes techniques related to output pictures. Initially, pictures in all layers may be marked for output. So for instance, if a middle box extracts layer0, then the middle box outputs all pictures of the layer0. However, when more than one layer is present in a bitstream, for example, then layer0 and layer1 pictures may be all marked for output, but the pictures in the same AU may have the same content, such that only one picture needs to be output from the AU. According to a technique of this disclosure, a middle box may be configured to only output a picture with the highest layer ID in an AU. In another example, a flag may be signaled in any parameter set, slice header or elsewhere to indicate which layers are output, or whether all layers are output. Outputting more than one picture in an AU may be useful for overlaying or multi-view purposes.

Figure 6:
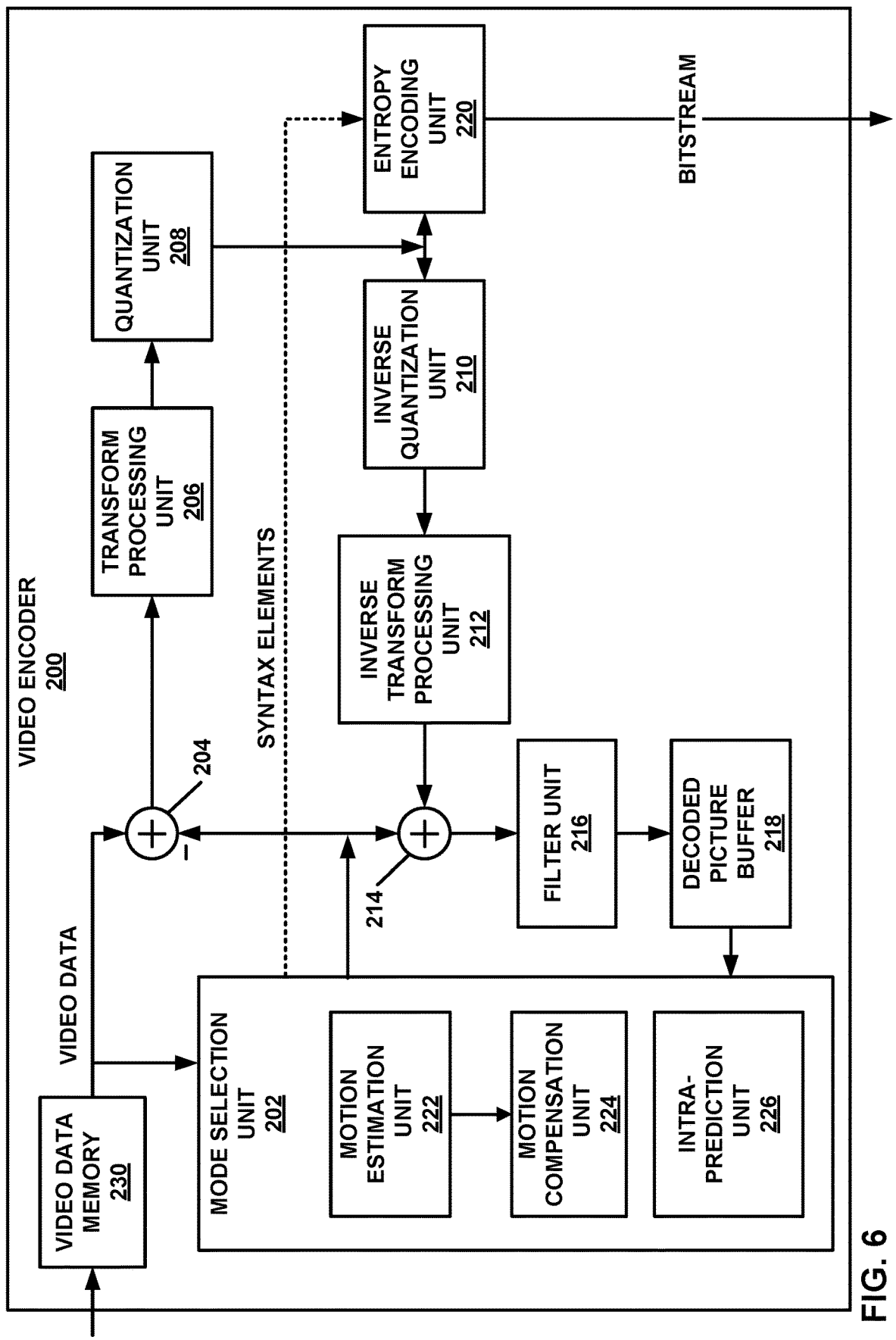
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the H.265 (HEVC) video coding standard and the H.266 (VVC) video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette coding unit, an intra-block copy coding unit (which may be part of motion estimation unit 222 and/or motion compensation unit 224), an affine coding unit, a linear model (LM) coding unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are performed, reconstruction unit 214 may store reconstructed blocks to DPB 218. In examples where operations of filter unit 216 are not performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a video encoder that includes a memory and one or more processors implemented in circuitry and configured to obtain multi-layer video data that includes at least a first layer, a second layer, and a third layer; determine a layer identification value for the first layer, a layer identification value for the second layer, and a layer identification value for the third layer, with the layer identification value for the third layer being higher than the layer identification value for the second layer and the layer identification value for the second layer being higher than the layer identification for the second value; store decoded pictures of the first layer, decoded pictures of the second layer, and decoded pictures of the third layer in a decoded picture buffer; in response to determining that a picture of the second layer is an IDR picture, remove from the decoded picture buffer, all decoded pictures of the second layer and all decoded pictures of the third layer, while leaving in the decoded picture buffer all decoded pictures of the first layer; and after removing from the decoded picture buffer all the decoded pictures of the second layer and all the decoded pictures of the third layer, retrieve a copy of a decoded picture of the first layer to predict a block of a current picture of the multi-layer video data.

Video encoder 200 also represents an example of a video encoder that includes a memory and one or more processors implemented in circuitry and configured to obtain the multi-layer video data that includes at least a first layer and a second layer; determine a layer identification value for the first layer and a layer identification value for the second layer, wherein the layer identification value for the second layer is higher than the layer identification value for the first layer; store decoded pictures of the first layer and decoded pictures of the second layer in a decoded picture buffer; and in response to determining that an IDR picture belongs to the second layer, remove from the decoded picture buffer, all decoded pictures of the second layer while leaving in the decoded picture buffer all decoded pictures of the first layer.

Figure 7:
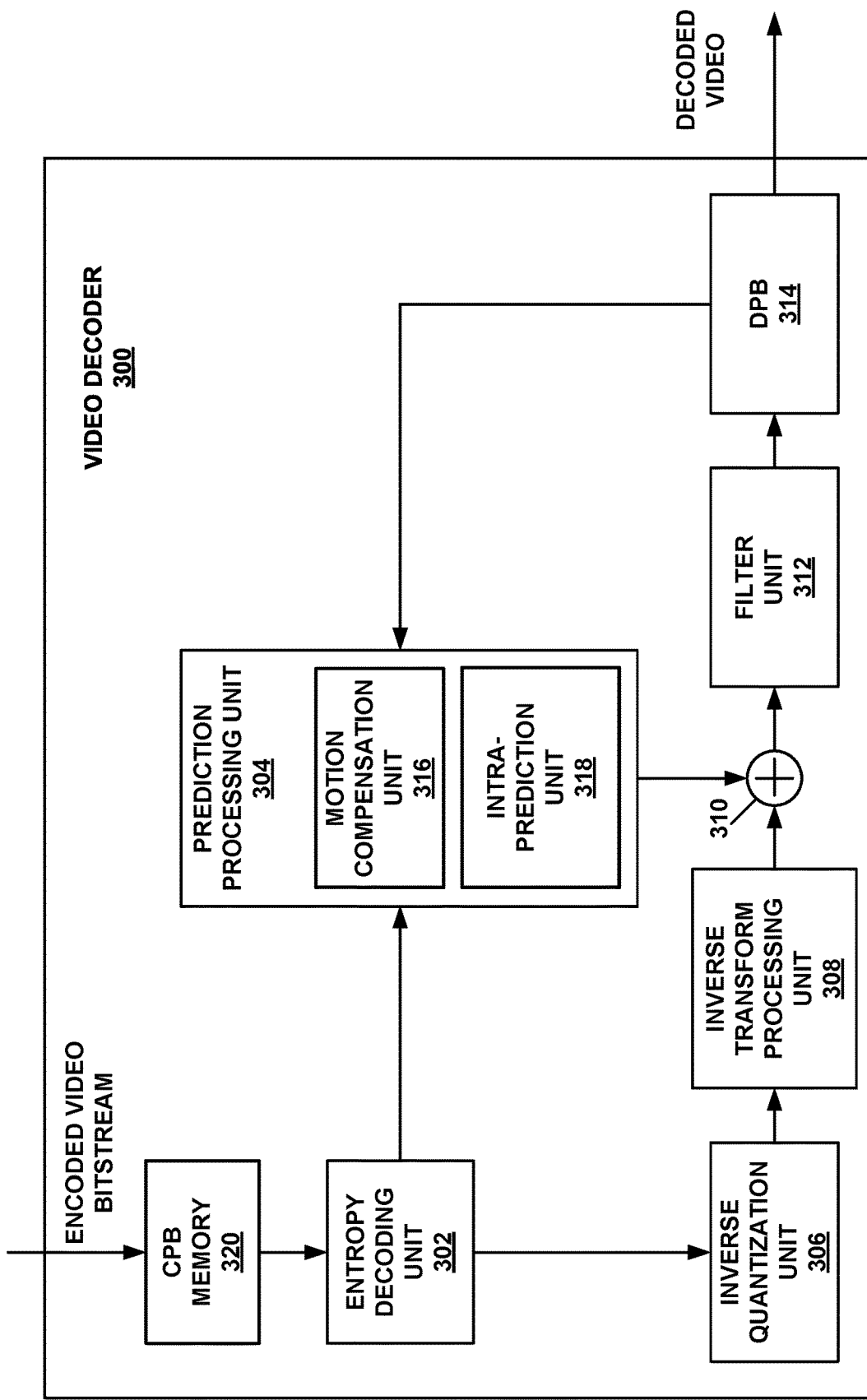
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette coding unit, an intra-block copy coding unit (which may form part of motion compensation unit 316), an affine coding unit, a linear model (LM) coding unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a video decoder that includes a memory and one or more processors implemented in circuitry and configured to receive multi-layer video data that includes at least a first layer, a second layer, and a third layer; determine a layer identification value for the first layer, a layer identification value for the second layer, and a layer identification value for the third layer, wherein the layer identification value for the third layer is higher than the layer identification value for the second layer, and the layer identification value for the second layer is higher than the layer identification for the second value; store decoded pictures of the first layer, decoded pictures of the second layer, and decoded pictures of the third layer in a decoded picture buffer; in response to determining that a picture of the second layer is an IDR picture, remove from the decoded picture buffer, all decoded pictures of the second layer and all decoded pictures of the third layer, while leaving in the decoded picture buffer all decoded pictures of the first layer; and after removing from the decoded picture buffer all the decoded pictures of the second layer and all the decoded pictures of the third layer, retrieve a copy of a decoded picture of the first layer to predict a block of a current picture of the multi-layer video data.

Video decoder 300 also represents an example of a video decoder that includes a memory and one or more processors implemented in circuitry and configured to obtain the multi-layer video data that includes at least a first layer and a second layer; determine a layer identification value for the first layer and a layer identification value for the second layer, wherein the layer identification value for the second layer is higher than the layer identification value for the first layer; store decoded pictures of the first layer and decoded pictures of the second layer in a decoded picture buffer; and in response to determining that an IDR picture belongs to the second layer, remove from the decoded picture buffer, all decoded pictures of the second layer while leaving in the decoded picture buffer all decoded pictures of the first layer.

Video decoder 300 also represents an example of a video decoder that includes a memory and one or more processors implemented in circuitry and configured to receive a first picture in the video data; determine a POC value for the first picture; receive a second picture in the video data; determine a POC value for the second picture; and detect a start of a new access unit based on the POC value for the first picture and the POC value for the second picture. To detect the start of the new access unit based on the POC value for the first picture and the POC value for the second picture, video decoder 300 may, for example, compare the POC value for the first picture to the POC value for the second picture, and in response to the POC value for the second picture being different by more than a threshold amount than the POC value for the first picture, detect the start of the new access unit. The second picture may belong to the new access unit, and the first picture may belong to a previous access unit. The first picture may have the lowest POC value of all pictures in the previous access unit.

Video decoder 300 also represents an example of a video decoder that includes a memory and one or more processors implemented in circuitry and configured to receive a first NAL unit in the video data; determine a temporal identification (ID) for the first NAL unit; receive a second NAL unit in the video data; determine a temporal ID for the second NAL unit; and detect a start of a new access unit based on the temporal ID for the first NAL unit and the temporal ID for the second NAL unit. To detect the start of the new access unit based on the temporal ID for the first NAL unit and the temporal ID for the second NAL unit, video decoder 300 may compare the temporal ID for the first NAL unit to the temporal ID for the second NAL unit, and in response to the temporal ID for the first NAL unit being different than the temporal ID for the second NAL unit, detect the start of the new access unit. The second NAL unit may belong to the new access unit, and the first NAL unit belong to a previous access unit.

Figure 8:
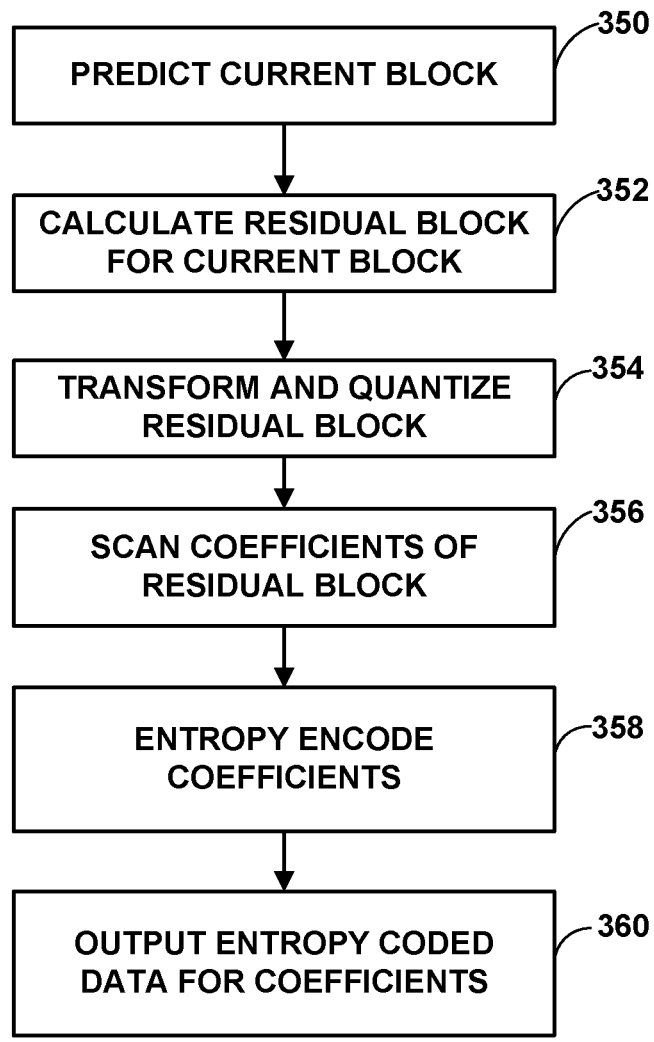
FIG. 8 is a flowchart illustrating a video encoding process.

FIG. 8 is a flowchart illustrating an example process for encoding a current block. The current block may comprise a current CU. Although described with respect to video encoder 200 (FIGS. 1 and 6), it should be understood that other devices may be configured to perform a process similar to that of FIG. 8.

In this example, video encoder 200 initially predicts the current block (350). As part of predicting the current block, video encoder 200 may maintain a DPB in accordance with the techniques described herein. For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 9:
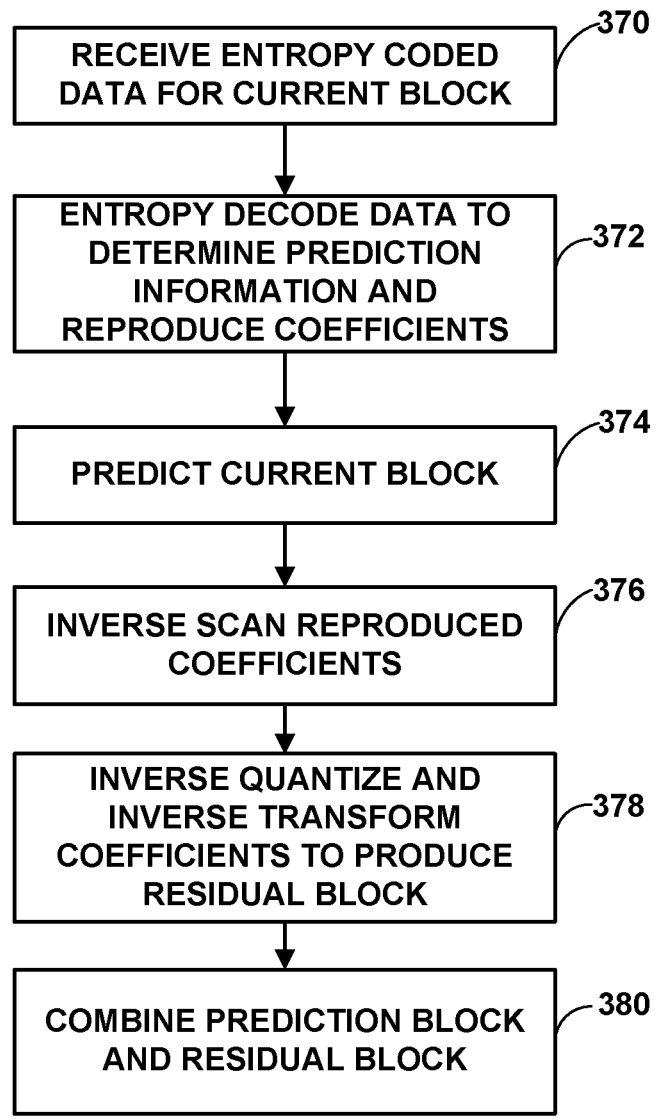
FIG. 9 is a flowchart illustrating a video decoding process.

FIG. 9 is a flowchart illustrating an example process for decoding a current block of video data. The current block may comprise a current CU. Although described with respect to video decoder 300 (FIGS. 1 and 8), it should be understood that other devices may be configured to perform a process similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. As part of predicting the current block, video encoder 200 may maintain a DPB in accordance with the techniques described herein. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 10:
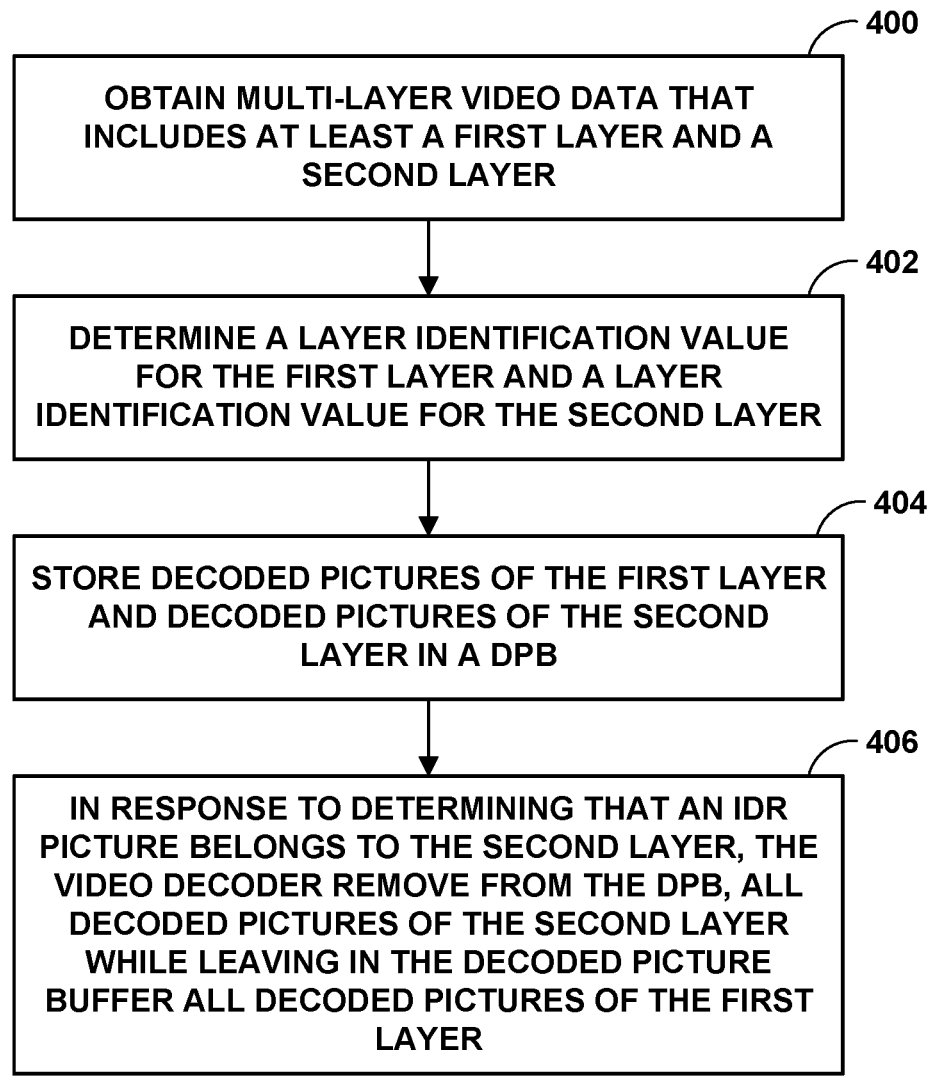
FIG. 10 is a flowchart illustrating an example process for maintaining a DPB.

FIG. 10 is a flowchart illustrating an example process for maintaining a DPB. The techniques of FIG. 10 will be described with respect to a generic video decoder. That generic video decoder may, for example, correspond to video decoder 300 or to the decoding functionality of video encoder 200. The generic video decoder may, for example, be part of a wireless communication device that includes a receiver configured to receive multi-layer video data. The video decoder may be part of a telephone handset with a receiver configured to demodulate, according to a wireless communication standard, a signal comprising the multi-layer video data. In other examples, the generic video decoder may be part of one or more of a camera, a computer, a mobile device, a broadcast receiver device, or a set-top box. The generic video decoder may, in some examples, include or be in communication with a display configured to display decoded multi-layer video data.

The video decoder obtains multi-layer video data that includes at least a first layer and a second layer (400). Video decoder 300 may, for example, obtain the multi-layer video data from an encoded bitstream stored in CPB memory 320. Video encoder 200 may, for example, obtain the multi-layer video data as an output from filter unit 216 or from DPB 218. The first layer may, for example, be an independently decodable layer, and the second layer may depend on the first layer, meaning video decoder 300 needs access to information included in the first layer in order to decode the second layer.

The video decoder determines a layer identification value for the first layer and a layer identification value for the second layer (402). In this example, the layer identification values are different. In particular, the layer identification value for the second layer is higher than the layer identification value for the first layer.

The video decoder stores decoded pictures of the first layer and decoded pictures of the second layer in a DPB (404). The DPB may, for example, correspond to DPB 218 of FIG. 6 or DPB 314 of FIG. 7.

In response to determining that an IDR picture belongs to the second layer, the video decoder removes, e.g., discards or bumps, from the DPB, all decoded pictures of the second layer while leaving in the decoded picture buffer all decoded pictures of the first layer (406).

In one example, the multi-layer video data may include a third layer that has a layer identification value that is higher than the layer identification value for the second layer, and thus higher than the layer identification for the first layer. The video decoder stores decoded pictures of the third layer in the decoded picture buffer, and in response to determining that the IDR picture belongs to the second layer, removes from the decoded picture buffer, all decoded pictures of the second layer and all decoded pictures of the third layer, while leaving in the decoded picture buffer all decoded pictures of the first layer. After removing from the decoded picture buffer all the decoded pictures of the second layer and all the decoded pictures of the third layer, the video decoder retrieves a copy of a decoded picture of the first layer to predict a block of a current picture of the multi-layer video data. After retrieving the copy of the decoded picture of the first layer, the video decoder may, for example, use the copy of the decoded picture of the first layer as a reference picture for performing inter prediction. The video decoder may, for example, extract from the multi-layer video data a decodable bitstream that includes the first layer and the third layer without the second layer.

The video decoder may additionally be configured to obtain the multi-layer video data by receiving a first access unit comprising a first picture of one or more layers and receiving a second access unit comprising of one or more second pictures of the layers. The video decoder may, for example, determine that a VCL NAL unit of the second access unit corresponds to a start of the second access unit in response to determining (1) that a VCL NAL unit of the second access unit has a layer identification smaller than a layer identification of an immediately preceding picture in decoding order and (2) that the VCL NAL unit of the second access unit has a POC value different than a POC value for the immediately preceding picture in decoding order. A NAL unit received between the VCL NAL unit of the second access unit and a last VCL NAL unit of the immediately preceding picture may be an access unit delimiter NAL unit.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include a computer-readable storage medium storing instructions, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include any one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding multi-layer video data, the method comprising:
    obtaining the multi-layer video data, wherein the multi-layer video data comprises at least a first layer, a second layer, and a third layer;
    determining a layer identification value for the first layer and a layer identification value for the second layer, wherein the layer identification value for the second layer is higher than the layer identification value for the first layer;
    determining a layer identification value for the third layer, wherein the layer identification value for the third layer is higher than the layer identification value for the second layer;
    storing decoded pictures of the first layer, decoded pictures of the second layer, and decoded pictures of the third layer in a decoded picture buffer;
    in response to determining that an instantaneous decoding refresh (IDR) picture belongs to the second layer, removing from the decoded picture buffer, all decoded pictures of the second layer and all decoded pictures of the third layer while leaving in the decoded picture buffer all decoded pictures of the first layer; and
    after removing from the decoded picture buffer all of the decoded pictures of the second layer and all of the decoded pictures of the third layer, retrieving a copy of a decoded picture of the first layer to predict a block of a current picture of the multi-layer video data.

2. The method of claim 1, wherein the first layer comprises an independently decodable layer.

3. The method of claim 1, wherein the second layer depends on the first layer.

4. The method of claim 1, further comprising:
    extracting from the multi-layer video data a decodable bitstream that includes the first layer and the third layer without the second layer.

5. The method of claim 1, further comprising:
    wherein obtaining the multi-layer video data comprising at least the first layer and the second layer comprises receiving a first access unit comprising first pictures of one or more layers and receiving a second access unit comprising second pictures of the one or more layers.

6. The method of claim 5, further comprising:
    in response to determining (1) that a video coding layer (VCL) network abstraction layer (NAL) unit of the second access unit has a layer identification smaller than a layer identification of an immediately preceding picture in decoding order and (2) that the VCL NAL unit of the second access unit has a picture order count (POC) value different than a POC value for the immediately preceding picture in the decoding order, determining that the VCL NAL unit of the second access unit corresponds to a start of the second access unit; and
    in response to determining that the VCL NAL unit of the second access unit corresponds to the start of the second access unit, determining that the second pictures of the second access unit are associated with a same time output.

7. The method of claim 6, wherein a NAL unit received between the VCL NAL unit of the second access unit and a last VCL NAL unit of the immediately preceding picture comprises an access unit delimiter NAL unit.

8. The method of claim 1, wherein obtaining the multi-layer video data comprises storing the multi-layer video data in a memory of a wireless communication device, the method further comprising:
    encoding the multi-layer video data with one or more processors of the wireless communication device; and
    transmitting the encoded multi-layer video data from a transmitter of the wireless communication device.

9. The method of claim 8, wherein the wireless communication device comprises a telephone handset and wherein transmitting the multi-layer video data at the transmitter of the wireless communication device comprises modulating, according to a wireless communication standard, a signal comprising the multi-layer video data.

10. The method of claim 1, wherein obtaining the multi-layer video data comprises receiving the multi-layer video data at a receiver of a wireless communication device, the method further comprising:
    storing the multi-layer video data in a memory of the wireless communication device; and
    decoding the multi-layer video data with one or more processors of the wireless communication device.

11. The method of claim 10, wherein the wireless communication device comprises a telephone handset and wherein receiving the multi-layer video data at the receiver of the wireless communication device comprises demodulating, according to a wireless communication standard, a signal comprising the multi-layer video data.

12. A device for decoding multi-layer video data, the device comprising:
    a memory configured to store the multi-layer video data; and
    one or more processors implemented in circuitry and configured to:
    obtain the multi-layer video data, wherein the multi-layer video data comprises at least a first layer, a second layer, and a third layer;
    determine a layer identification value for the first layer and a layer identification value for the second layer, wherein the layer identification value for the second layer is higher than the layer identification value for the first layer;
    determine a layer identification value for the third layer, wherein the layer identification value for the third layer is higher than the layer identification value for the second layer;
    store decoded pictures of the first layer, decoded pictures of the second layer, and decoded pictures of the third layer in a decoded picture buffer;
    in response to determining that an instantaneous decoding refresh (IDR) picture belongs to the second layer, remove from the decoded picture buffer, all decoded pictures of the second layer and all decoded pictures of the third layer while leaving in the decoded picture buffer all decoded pictures of the first layer; and
    after removing from the decoded picture buffer all of the decoded pictures of the second layer and all of the decoded pictures of the third layer, retrieve a copy of a decoded picture of the first layer to predict a block of a current picture of the multi-layer video data.

13. The device of claim 12, wherein the first layer comprises an independently decodable layer.

14. The device of claim 12, wherein the second layer depends on the first layer.

15. The device of claim 12, wherein the one or more processors are further configured to:
    extract from the multi-layer video data a decodable bitstream that includes the first layer and the third layer without the second layer.

16. The device of claim 12, wherein to obtain the multi-layer video data comprising at least the first layer and the second layer, the one or more processors are further configured to receive a first access unit comprising first pictures of one or more layers and receiving a second access unit comprising second pictures of the one or more layers.

17. The device of claim 16, wherein the one or more processors are further configured to:
    in response to determining (1) that a video coding layer (VCL) network abstraction layer (NAL) unit of the second access unit has a layer identification smaller than a layer identification of an immediately preceding picture in decoding order and (2) that the VCL NAL unit of the second access unit has a picture order count (POC) value different than a POC value for the immediately preceding picture in decoding order, determine that the VCL NAL unit of the second access unit corresponds to a start of the second access unit; and
    in response to determining that the VCL NAL unit of the second access unit corresponds to the start of the second access unit, determine that the second pictures of the second access unit are associated with a same time output.

18. The device of claim 17, wherein a NAL unit received between the VCL NAL unit of the second access unit and a last VCL NAL unit of the immediately preceding picture comprises an access unit delimiter NAL unit.

19. The device of claim 12, wherein the device comprises a wireless communication device, further comprising a receiver configured to receive the multi-layer video data.

20. The device of claim 19, wherein the wireless communication device comprises a telephone handset and wherein the receiver is configured to demodulate, according to a wireless communication standard, a signal comprising the multi-layer video data.

21. The device of claim 12, further comprising:
    a display configured to display decoded multi-layer video data.

22. The device of claim 12, wherein the device comprises one or more of a camera, a computer, a mobile device, a broadcast receiver device, or a set-top box.

23. A computer-readable storage medium storing instructions that when executed by one or more processors cause the one or more processor to:
    obtain the multi-layer video data, wherein the multi-layer video data comprises at least a first layer, a second layer, and a third layer;
    determine a layer identification value for the first layer and a layer identification value for the second layer, wherein the layer identification value for the second layer is higher than the layer identification value for the first layer;
    determine a layer identification value for the third layer, wherein the layer identification value for the third layer is higher than the layer identification value for the second layer;
    store decoded pictures of the first layer, decoded pictures of the second layer, and decoded pictures of the third layer in a decoded picture buffer;
    in response to determining that an instantaneous decoding refresh (IDR) picture belongs to the second layer, remove from the decoded picture buffer, all decoded pictures of the second layer and all decoded pictures of the third layer while leaving in the decoded picture buffer all decoded pictures of the first layer; and after removing from the decoded picture buffer all of the decoded pictures of the second layer and all of the decoded pictures of the third layer, retrieve a copy of a decoded picture of the first layer to predict a block of a current picture of the multi-layer video data.

24. An apparatus for decoding multi-layer video data, the apparatus comprising:

means for obtaining the multi-layer video data, wherein the multi-layer video data comprises at least a first layer, a second layer, and a third layer;

means for determining a layer identification value for the first layer and a layer identification value for the second layer, wherein the layer identification value for the second layer is higher than the layer identification value for the first layer;

means for determining a layer identification value for the third layer, wherein the layer identification value for the third layer is higher than the layer identification value for the second layer;

means for storing decoded pictures of the first layer, decoded pictures of the second layer, and decoded pictures of the third layer in a decoded picture buffer;

means for removing from the decoded picture buffer, all decoded pictures of the second layer and all decoded pictures of the third layer while leaving in the decoded picture buffer all decoded pictures of the first layer in response to determining that an instantaneous decoding refresh (IDR) picture belongs to the second layer; and means for retrieving a copy of a decoded picture of the first layer to predict a block of a current picture of the multi-layer video data after removing from the decoded picture buffer all of the decoded pictures of the second layer and all of the decoded pictures of the third layer.

* * * * *